May 4, 1948.  C. J. HAUCK  2,440,745
HOSE STAND BASE
Filed Dec. 9, 1944
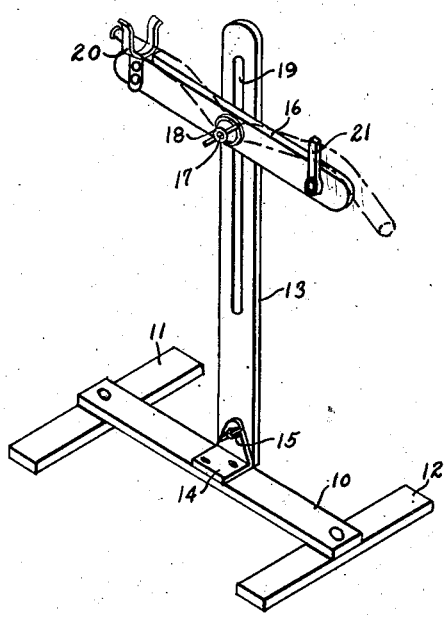
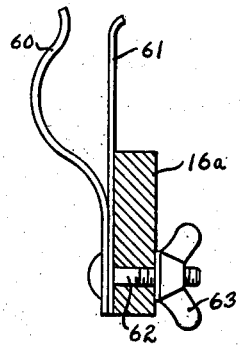
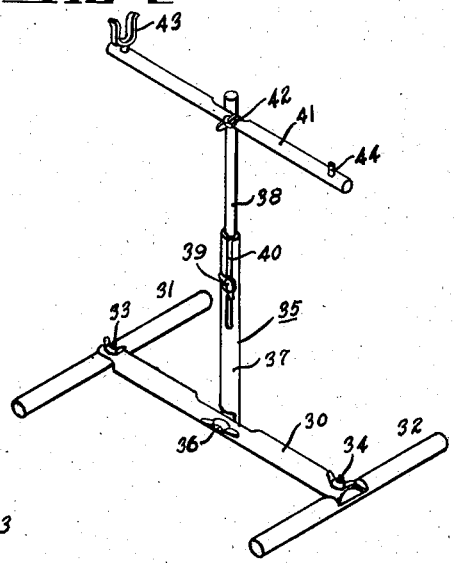
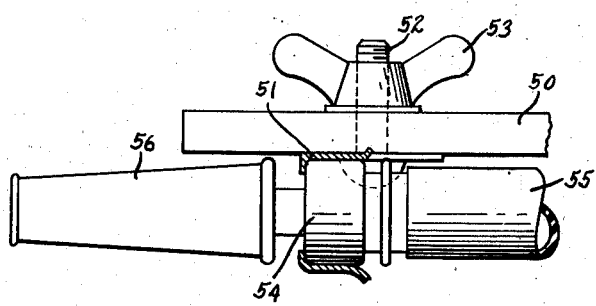
INVENTOR
CORNELIUS J. HAUCK
BY
ATTORNEYS

UNITED STATES PATENT OFFICE 2,440,745

HOSE STAND BASE

Cornelius J. Hauck, Cincinnati, Ohio

Application December 9, 1944, Serial No. 567,485

2 Claims. (Cl. 248—81)

This invention relates to an apparatus for supporting a hose and nozzle in a stationary predetermined position for purposes of sprinkling the lawn, shrubbery, etc.

An object of the invention is to provide a standard that is adjustable for supporting a sprinkling nozzle in any desired position so that water can be thrown by the nozzle at any angle around the clock.

Still another object of the invention is to provide a sprinkling nozzle that is adjustable so that water can be thrown from the nozzle under low objects or over high objects.

Still another object of the invention is to provide a sprinkling stand that is adapted to be used with the conventional hose and nozzle in such a manner that the nozzle can be adjusted for throwing the water in any direction.

Still another object of the invention is to provide a sprinkling stand for use with a conventional hose and nozzle which is inexpensive to manufacture.

Further objects and advantages will become apparent from the drawings and following description.

Figure 1 is a perspective elevational view of the sprinkling stand of this invention.

Figure 2 is a perspective elevational view of the sprinkling stand of this invention showing the manner of manufacturing the same from metal tubing.

Figure 3 is a cross-sectional view of the cross arm of the stand showing a modified arrangement of the hose clamp.

Figure 4 is a top elevational view of a still further modified arrangement of a hose clamp for attaching the hose to the cross arm of the stand so that the nozzle can be adjusted.

Figure 5 is a perspective elevational view of a mechanism for positioning the hose upon the cross arm.

Many of the commercial sprinkling devices that are manufactured are adapted to throw a conical spray wherein the axis of the cone stands vertically. While these devices may be satisfactory for sprinkling large flat areas yet they are not fully satisfactory for sprinkling areas beneath low bushes, nor can they sprinkle the areas beneath the low bushes simultaneously with sprinkling other areas behind the bushes. Also, when water is to be thrown a substantial distance, the usual type of conical sprinkler is not satisfactory because it is limited in its throwing power.

The sprinkling stand of this invention is constructed and arranged to be used in association with a conventional garden hose and nozzle so that the full advantages of a conical type sprinkler can be obtained and yet gain advantages over the conventional type of sprinkler in that both near and distant areas can be sprinkled simultaneously. The sprinkling stand is fully adjustable to permit the nozzle of the garden hose to be placed at any desirable height within the limits of the sprinkling stand, and to permit the nozzle to throw water in any angular direction around the clock. It will also be recognized that when the usual type of garden hose nozzle is used that any type of water discharge can be obtained from a fine conical spray to a strong single stream. Thus, the use of a garden hose and nozzle provides a combination, when used with the sprinkling stand of this invention that allows an unusual variation in control over the type of spray or stream to be used in sprinkling, as well as the location to which it is to be thrown.

In this invention the sprinkling stand illustrated in Figure 1 consists of a horizontal bar 10 that is provided with legs 11 and 12 positioned at right angles to the bar 10 and secured thereto in any suitable manner. An upright bar 13 carried upon the horizontal bar 10 by means of a bracket 14, a bolt and thumb screw 15 extending through the bracket 14 and the upright bar 13 to hold the same in position relative to the horizontal bar 10.

A cross arm 16 is carried upon the vertical bar 13 that is adapted to be secured thereon by means of a bolt 17 and a thumb screw 18. The bolt 17 extends through a slot 19 extending longitudinally in the vertical bar 13 to adjust the vertical position of the cross arm 16, and also to permit angular adjustment of the cross arm 16 relative to the vertical bar 13.

A hose clamp 20 is secured on one end of the cross arm 16 and in which the nozzle end of the garden hose is adapted to be positioned as illustrated in dash lines. The opposite end of the cross arm 16 carries a small vertical bar 21 which retains the garden hose upon the end of the cross arm 16 as it drapes to the ground.

From the foregoing description it will be apparent that when the nozzle of the garden hose is set for a conical spray, and the nozzle is positioned in a horizontal direction as illustrated in Figure 1, that the spray from the nozzle will throw beneath low bushes as well as over the top of same and thereby provide a more satisfactory coverage of the area to be sprinkled. Also, as the cross arm 16 is rotated in a clockwise direction, the conical spray from the nozzle of the garden hose can be used for sprinkling broad flat areas, much in the manner as the conventional stationary conical sprays. However, since the cross arm 16 is adjustable vertically, the height to which the conical spray is thrown by the nozzle will be substantially increased, and thereby allow the conical spray to throw over low bushes. If it is desired to throw a stronger stream of water from the nozzle of the garden hose to reach areas behind relatively tall bushes, the nozzle of the garden hose can be adjusted toward the single stream position and thereby increase the throwing power of the stream. By properly adjusting the angular position of the cross arm 16, and its height relative to the ground, any sprinkling condition can be met for placing water in just the right areas for the desired sprinkling.

The sprinkling stand of this invention is also sufficiently compact that it can be folded into a small unit and readily stored in an inconspicuous place, the adjusting thumb screws 15 and 18 allowing for folding of the sprinkling stand.

In the arrangement of the device illustrated in Figure 2, the sprinkling stand is constructed from metal tubing, while the device illustrated in Figure 1 may preferably be constructed from wood, but could be constructed from metal bars if desired.

In the device illustrated in Figure 2, the stand consists of a horizontal bar 30 that has the two bars 31 and 32 attached thereto by means of suitable bolts and thumb screws 33 and 34. A vertical post 35 is attached to the horizontal bar 30 by means of a bolt and thumb screw 36. The vertical bar 35 consists of a lower tube 37 in which an upper tube 38 telescopes. The upper tube 38 carries a bolt having a thumb screw 39 on the end thereof for passage in the slot 40 in the lower tube 37 whereby to allow for adjustment of the upper tube 38 vertically relative to the lower tube.

A cross arm 41 is carried upon the upper end of the upper tube 38 by means of a bolt and thumb screw 42. One end of the cross arm 41 carries a hose clamp 43 in which a garden hose can be placed in the same manner as illustrated in Figure 1, and one end of the cross arm 41 carries a vertical pin 44 to hold the garden hose upon the cross arm 41 as it drapes to the ground.

It will be apparent from the foregoing description that the operation of the device illustrated in Figure 2 will be the same as that described with regard to the device illustrated in Figure 1. The thumb screws 33, 34, 36, 39 and 42, or suitable bolts used in place of the thumb screws, provide for disassembly of the various elements of the stand to permit its storage in a small space.

In Figure 4 there is illustrated a slightly modified arrangement of a clamp for holding the nozzle upon the cross arm 16 or 41 of the sprinkling stand. In this device the cross arm 50 carries the hose clamp 51 that is secured to the cross arm 50 by means of the bolt 52 and the thumb screw 53. The clamp 51 is a spring clamp type of device adapted to partially surround the rear end of a nozzle 54 that is attached to the garden hose 55. It will be noted that the clamp 51 is constructed and arranged to hold the adjustable portion 56 of the nozzle 54 in spaced relation to the cross arm 50 so that the nozzle 54 can be adjusted for any type of water discharge desired.

In Figure 3 there is shown a slightly modified arrangement of the spring clamp device as illustrated in Figures 1 and 2 wherein the clamping member consists of two sheets spring members 60 and 61 that are attached to the cross arm 16a by means of the bolt 62 and thumb screw 63.

In Figure 5 there is shown a slightly modified arrangement of apparatus for holding the garden hose on the end of the cross arm opposite to the end to which the nozzle of the garden hose is attached. The arrangement consists of three pins 70, 71 and 72 arranged in a substantially tri-angular arrangement and secured to the cross arm 16b, the garden hose being adapted to be carried over the pin 70, under the pin 71 and over the pin 72 to thereby hold the garden hose upon the cross arm 16b by the spring that is normally within the conventional flexible garden hose.

While the apparatus disclosed and described herewith constitutes the preferred form of the invention yet it will be understood that the apparatus is capable of alteration without departing from the spirit of the invention and that all modifications that fall within the scope of the appended claims will be included herein.

Having thus fully described my invention, what I claim as new and desire to secure by Letters Patent, is:

1. A sprinkling stand consisting of, a base member, a vertical upright support member having one end thereof pivotally attached to said base member at substantially the center point thereof, a cross arm carried on said vertical upright member in a position thereon to allow extension of said member above said arm, means extending through said cross arm and said vertical upright member pivotally attaching said cross arm substantially at the center point thereof to said member for adjustment of the angular position of said cross arm with respect to the vertical upright member, means in said upright member for providing for vertical adjustment of said arm thereon, a hose clamp on one end of said cross arm, and pin means extending upwardly from the opposite end of said arm to prevent a hose draped over said arm between said pin and said upright member from sliding off said arm.

2. A sprinkling stand consisting of, a base member comprising a main bar having cross-bars pivotally attached thereto at opposite ends thereof and arranged substantially in a common plane, a vertical upright support member having one end thereof pivotally attached to said main bar at substantially the center point thereof, a cross arm carried on said vertical upright member in a position thereon to allow extension of said member above said arm, means extending through said cross arm and said vertical upright member pivotally attaching said cross arm substantially at the center point thereof to said member for adjustment of the angular position of said cross arm with respect to the vertical upright member, means in said upright member for providing for vertical adjustment of said arm thereon, a hose clamp for one end of said cross arm, and pin means extending upwardly from the opposite end of said arm to prevent a hose draped over said arm between said pin and said upright member from sliding off said arm.

CORNELIUS J. HAUCK.

REFERENCES CITED

The following references are of record in the file of this patent:

UNITED STATES PATENTS

| Number | Name | Date |
|---|---|---|
| 1,425,067 | Stone | Aug. 8, 1922 |
| 2,077,668 | Bristol | Apr. 20, 1937 |

FOREIGN PATENTS

| Number | Country | Date |
|---|---|---|
| 29,956 | Australia | Nov. 5, 1930 |